Oct. 21, 1924.
J. KLOPFENSTEIN
MEAT SAW
Filed May 1, 1922
1,512,425
2 Sheets-Sheet 2
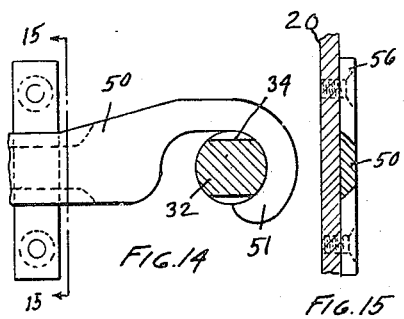
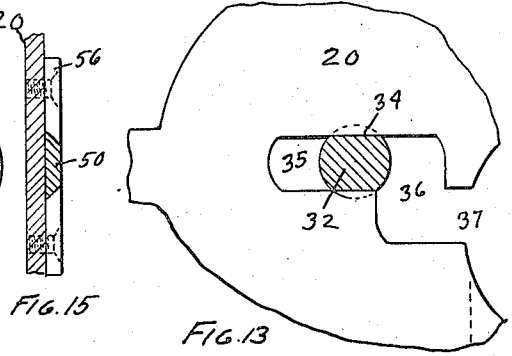
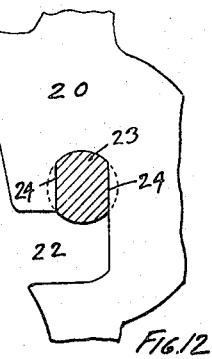
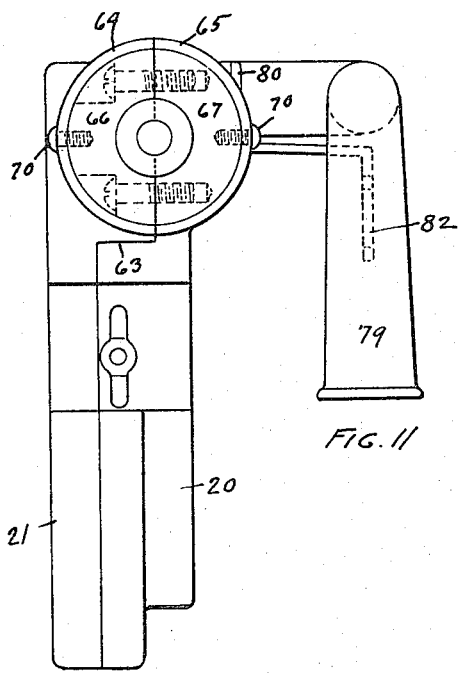
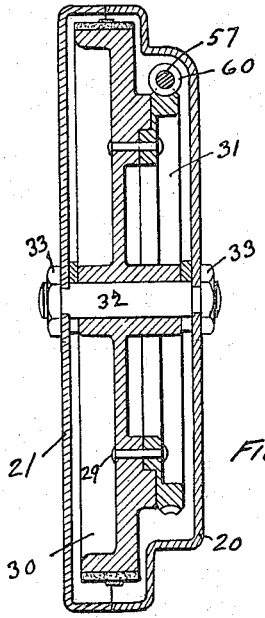
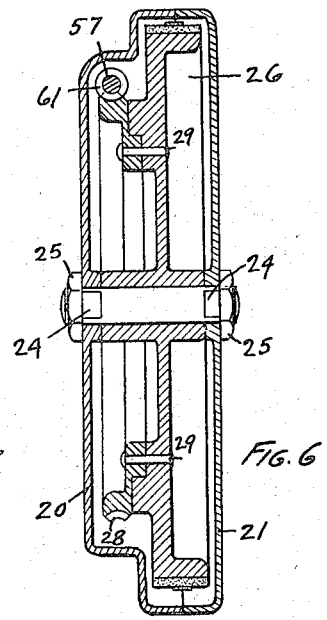
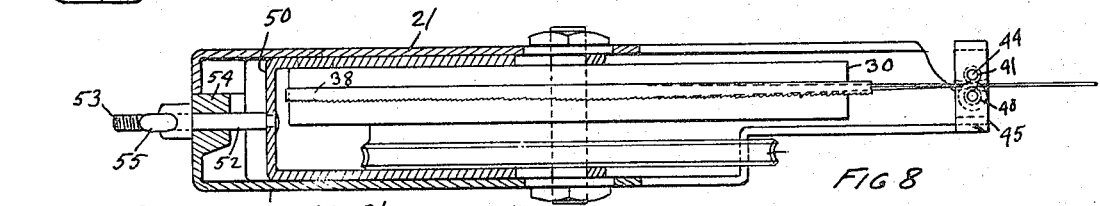
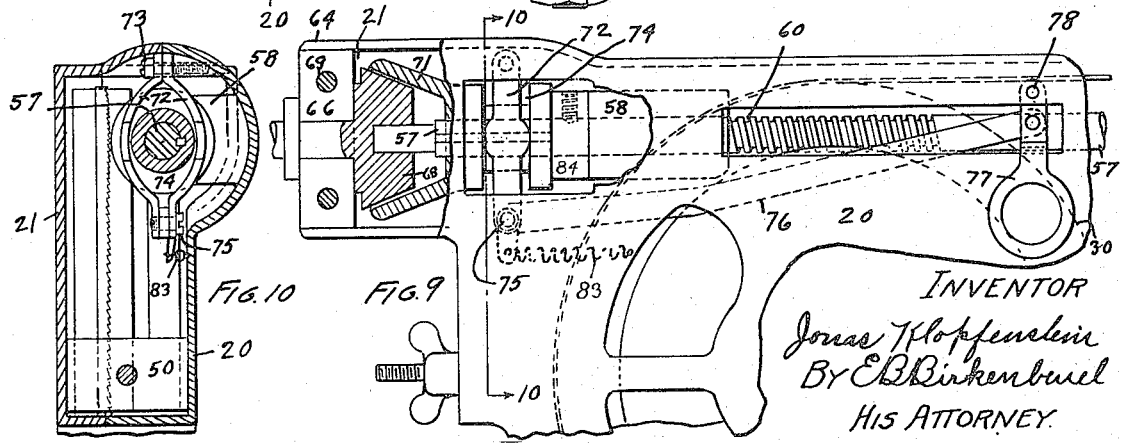
INVENTOR
Jonas Klopfenstein
By E.B.Birkenbuel
HIS ATTORNEY.

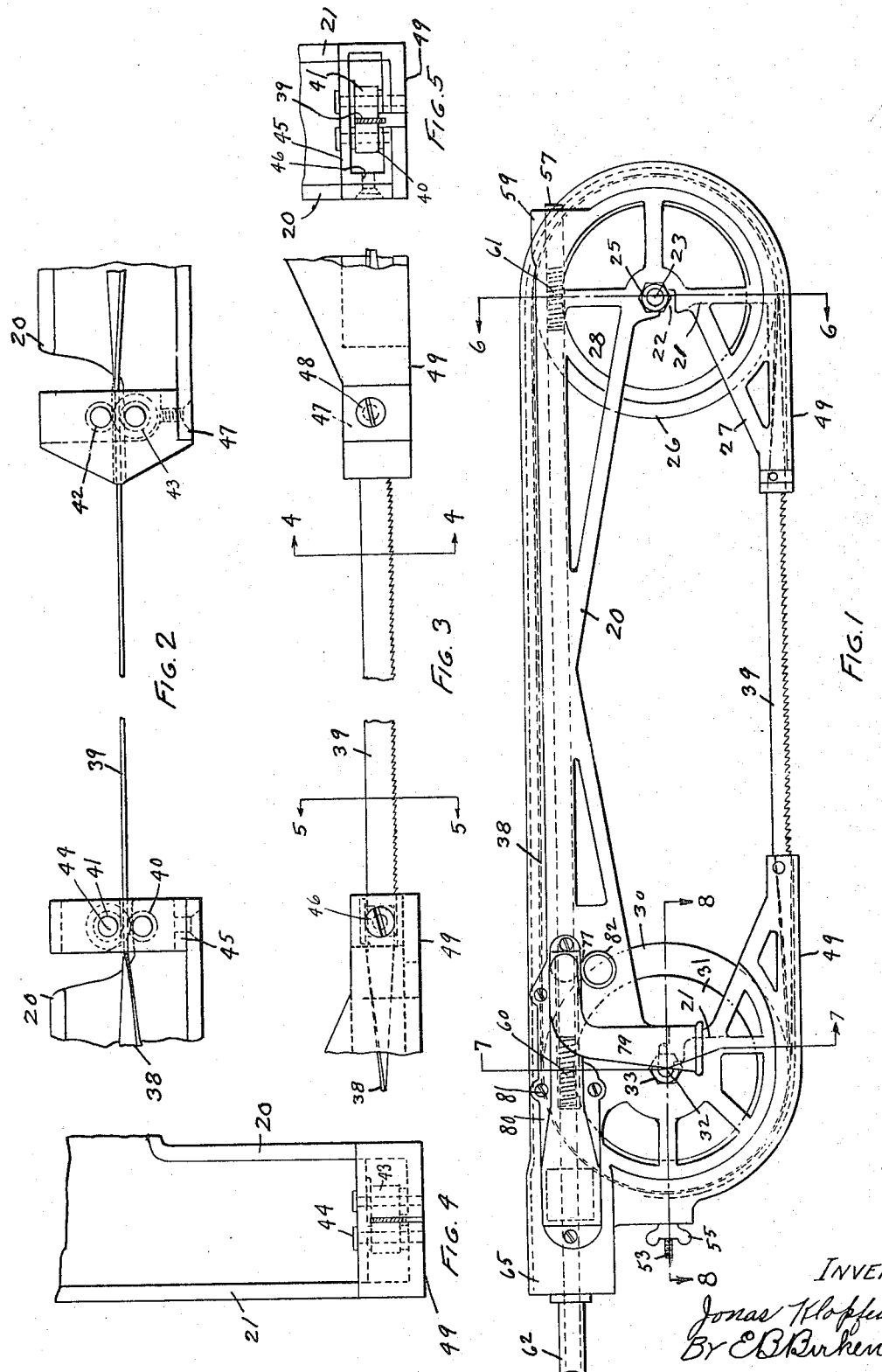

Patented Oct. 21, 1924.

1,512,425

UNITED STATES PATENT OFFICE.

JONAS KLOPFENSTEIN, OF PORTLAND, OREGON.

MEAT SAW.

Application filed May 1, 1922. Serial No. 557,739.

*To all whom it may concern:*

Be it hereby known that I, JONAS KLOPFENSTEIN, a citizen of the United States, and a resident of Portland, county of Multnomah, and State of Oregon, have invented a new and useful Meat Saw, of which the following is a specification.

This invention relates more particularly to band saws for meat cutting purposes.

The object of my invention is to provide an exceedingly simple and efficient meat saw which will be cheap, light and strong and yet have unusual range in cutting.

In the past it has been the practice when using band saws for cutting meat to run the saws straight or without twist, but in this invention I have chosen to give the saw a quarter twist while sawing so that the blades will lie in the same plane as the wheels over which it passes instead of at right angles thereto as is now the rule.

In order to accomplish these and other advantages which will soon become apparent I have constructed my saw in the manner set forth in the following specification and illustrated in the accompanying drawings, in which:—

Figure 1 is a front elevation of the machine drawn to a small scale and having minor details omitted. Figure 2 is an enlarged plan of the blade twisting mechanism of which Figure 3 is an elevation and Figure 4 a section along the line 4—4 in Fig. 3, while Figure 5 is a section along the line 5—5 in Fig. 3. Figure 6 is a vertical section along the line 6—6 in Fig. 1. Figure 7 is a vertical section along the line 7—7 in Fig. 1. Figure 8 is a horizontal section along the line 8—8 in Fig. 1. Figure 9 is a front elevation of the handle end of the saw with portions removed and other portions cut away for clearness. Figure 10 is a section along the line 10—10 in Fig. 9. Figure 11 is an elevation of the saw from the handle end. Figure 12 is a section through the forward shaft behind its lock nut. Figure 13 is a section through the rearward shaft behind its lock nut. Figure 14 is a section through the rearward shaft inside of the frame. Figure 15 is a section along the line 15—15 in Fig. 14.

Similar numbers of reference refer to the same or similar parts throughout the several views.

Referring in detail to the drawings, I have constructed my device of a main frame 20 against which is placed a companion frame and cover plate 21 between which are placed the working parts of my saw.

The members 20 and 21 are provided at their forward end with the L-shaped slot 22 into which are placed the shafts 23 having the flattened faces 24. The nuts 25 hold the shaft in the position shown in Fig. 12. This construction permits the removal of the shaft 23 and the leather covered saw pulley 26 which it carries without the separation of the members 20 and 21. This is made possible by the braces 27 not being used on the member 21.

A worm wheel 28 is secured to the pulley 26 by the rivets 29. The saw pulley 30 and the worm wheel 31 are mounted on the rear shaft 32 which is provided with the nuts 33. The flattened portions 34 on the shaft 32 fit snugly in the slot 35 in the members 20 and 21 and can be removed from same only by passing downwardly through the slot 36 and then forwardly through the slot 37. A narrow band saw 38 passes around the pulleys 26 and 30 in the usual manner, except that the portion 39 is given a quarter twist at two points by the rollers 40 and 41 and the rollers 42 and 43, all of which are mounted on the pins 44.

The rolls 40 and 41 are mounted in the housing 45 secured to the member 20 by the screw 46. The housing 45 and the member 20 are cut away as indicated to permit the insertion of the saw blade 38 without the removal of the rollers 40 or 41. The rollers 42 and 43 are carried by the combined scraper and housing 47 secured to the member 20 by the screw 48. It will be understood that the portion 49 of the member 20 is not split but extends the width of that portion of the members 20 and 21.

It will be observed that the rollers 41 and 43 are flanged on their upper side to support the saw when it is cutting but should not engage same at any other time.

The U-shaped frame 50 is provided with the hooks 51 at its ends and these engage the round portion of the shaft 32 just inside the members 20 and 21. A bolt 52 is attached to the U-shaped frame and its end 53 journals in the boss 54 and is provided with a wing nut 55 by means of which tension is applied to the saw blade 38. The beveled guides 56 hold the frame 50 in position when the member 21 is removed.

The shaft 57 journals in the bearings 58 and 59 and has cut in same the worm 60 which meshes with the wheel 31 and also the worm 61 which meshes with the wheel 28. The shaft 57 drives the two saw pulleys 26 and 30 at exactly the same speed. A flexible shaft 62 may be used to rotate the shaft 57.

At the handle end of the saw the parting line between the members 20 and 21 jogs over along the line 63 to the center of the shaft 57. At this point the members 20 and 21 form a cylinder having a common axis with the shaft 57. Between the halves 64 and 65 of the cylinder are placed the halves 66 and 67 of a bearing for the clutch cone 68. Screws 69 hold the portions of the bearing together and the screws 70 secure the bearing to the members 20 and 21. A clutch 71 is splined on the shaft 57 which also bears in the cone 68. A double strap 72 pivots at the screw 73 to the member 20 and passes around the groove 74 of the clutch 71 and is joined by the screw 75 to the connecting link 76 which is attached to the middle of a trigger lever 77 pivoted at 78 to the member 20.

A pistol shaped handle 79 which sets out from the frame 20 is attached thereto by means of the cover plate 80 of which it is a part by means of the screws 81. A ring shaped end 82 of the trigger is, of course, offset to correspond with the handle 79.

The operation of my device is as follows. When placing a blade into the saw the nuts 25 and 23 are loosened and the shafts 23 and 34 passed through their slots so that the worms and worm wheels are disengaged and the worm wheels and pulleys are removed long enough to insert the new blade after which they are replaced by passing the blade between the rolls 40 to 43 inclusive and around the pulleys 26 and 30. The wing nut 53 is then tightened and the saw is ready for use. The complete saw which weighs in the neighborhood of fifteen pounds is then handled like the ordinary hand saw except that it is not moved by hand.

It is evident that for slitting beeves and reaching ordinarily inaccessible places this saw is very convenient since its maximum width along its cutting portion is only two inches. The operator by holding his finger on the trigger 77 pulls the clutch 71 against the cone 68 and causes the pulleys 26 and 30 to rotate and the saw 38 to cut through the meat.

A spring 83 tends to hold the clutch out of engagement when the trigger 77 is not pulled backwardly. A thrust collar 84 is also placed on the shaft 57.

It will be understood that the device, in common with other power driven meat saws, may be suspended from a cable which passes over a sheave and is then secured to a counterweight to facilitate the handling of the saw under some conditions.

I am aware that many various kinds of saws have been constructed in the past I therefore do not wish to cover my device broadly but only within the limits set forth in 'the following claim.

What I claim as new is:

A hand-guided power-driven band saw having an elongated hollow frame member, said frame having its lower middle portion cut away and having horizontal slots cut forwardly into its forward portion and thence vertically: a shaft having flattened places adapted to pass through said vertical slots, said frame having two narrow horizontal slots formed in its rearward end in different planes, said last mentioned slots having a wide connecting slot between same a rear shaft having flattened places formed thereon which will permit same to pass through said narrow slots: a tension supplying mechanism consisting of a U-shaped frame having a hook at each end engaging the rear shaft and having a bolt projecting from said U-shaped frame through said saw frame: a nut on said projecting bolt: a pulley on each of said shafts: and a saw band passing around said pulleys having that portion of its length which lies in the cutaway part of the saw frame twisted into the plane of said saw frame.

JONAS KLOPFENSTEIN.